Feb. 22, 1938.  A. T. POTTER  2,109,256
WINDSHIELD OPERATING DEVICE
Filed Nov. 10, 1933  2 Sheets-Sheet 1
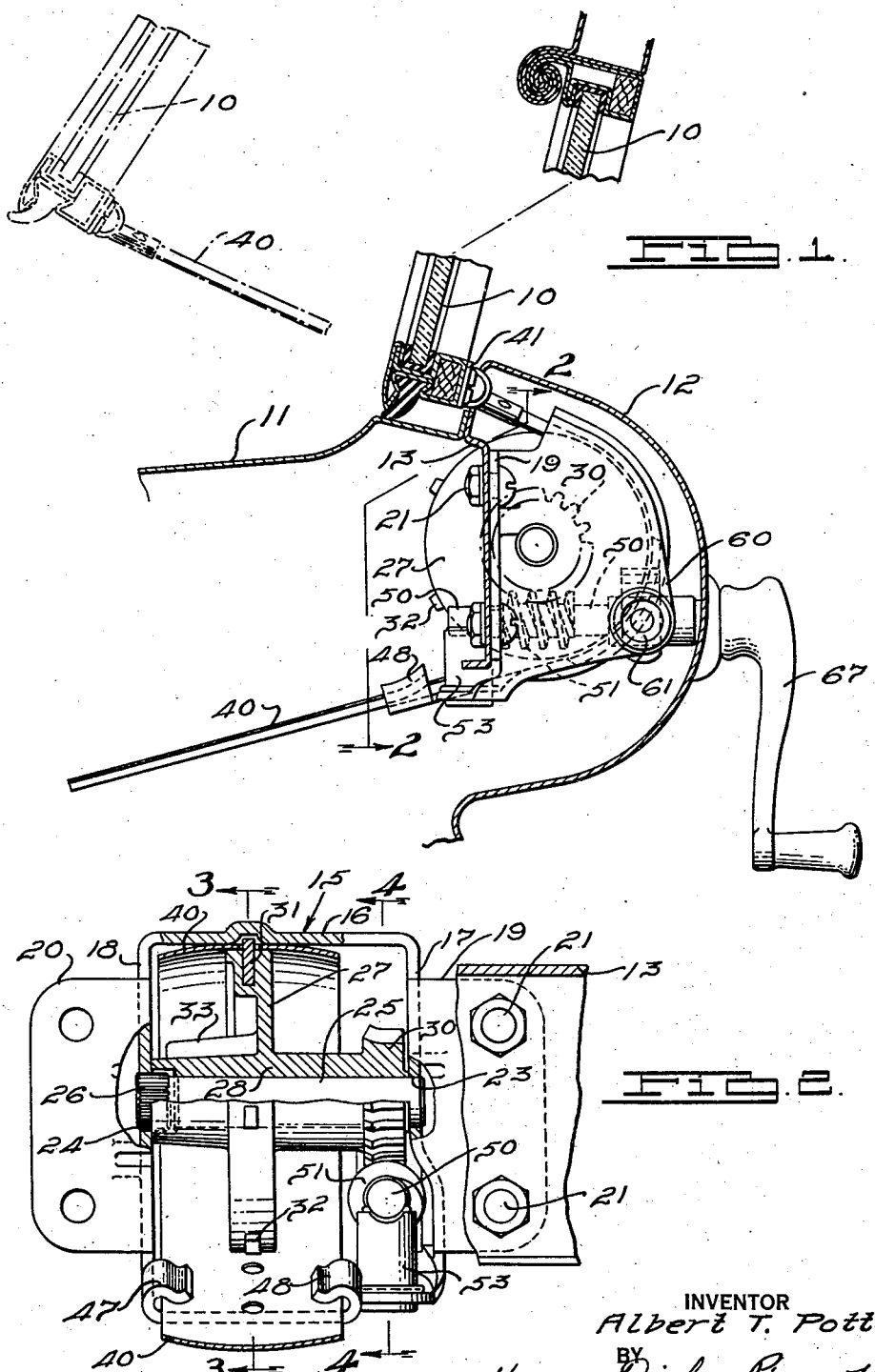
INVENTOR
Albert T. Potter.
BY
Harness, Dickey, Pierce & Hann,
ATTORNEYS.

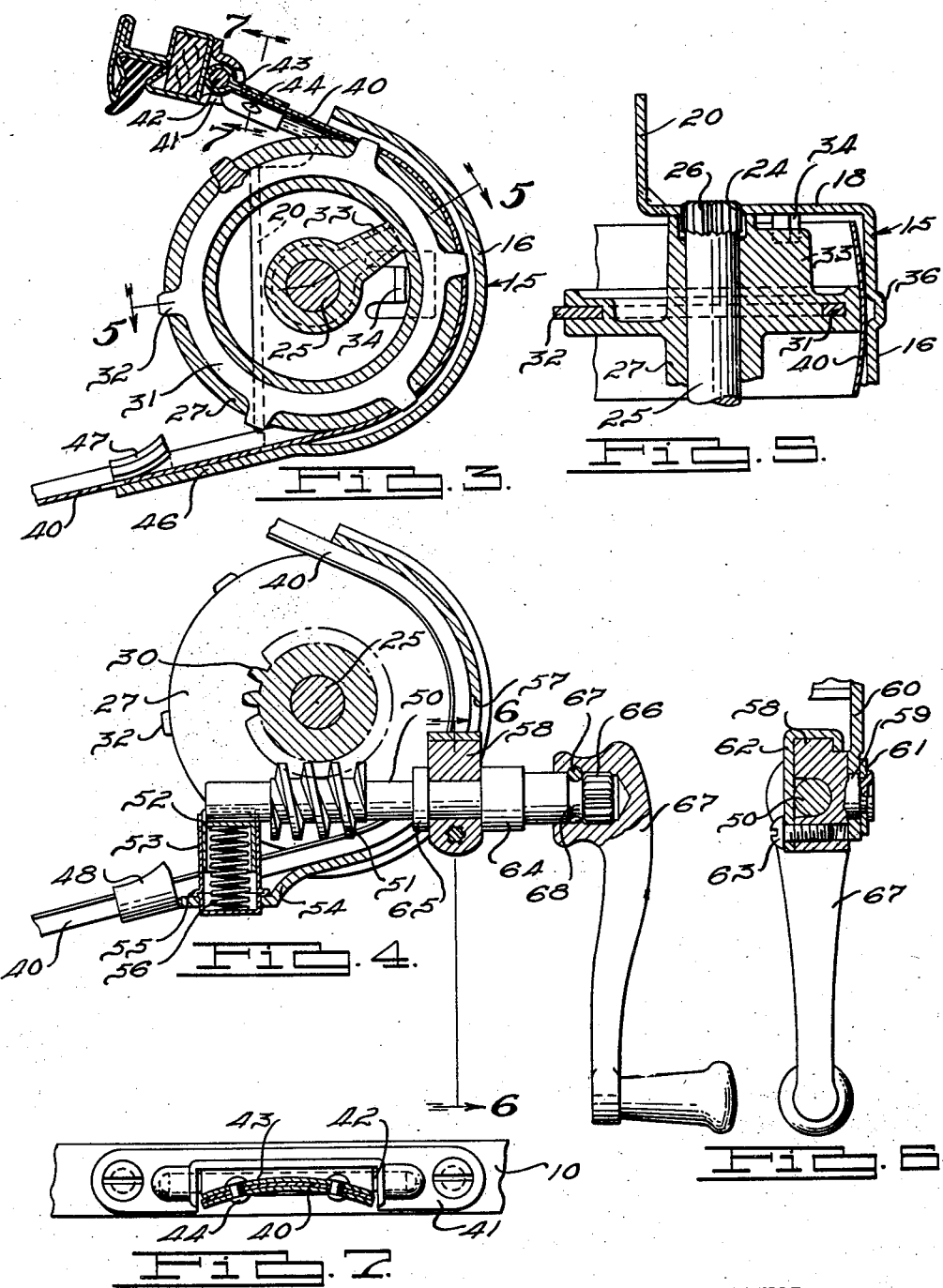

Patented Feb. 22, 1938

2,109,256

UNITED STATES PATENT OFFICE 2,109,256

WINDSHIELD OPERATING DEVICE

Albert T. Potter, Detroit, Mich., assignor to Ainsworth Manufacturing Corporation, a corporation of Michigan Application November 10, 1933, Serial No. 697,381

34 Claims. (Cl. 296—84)

The invention relates to closure operating devices and it has particular relation to a device for opening and closing windshields on automobiles.

One object of the invention is to provide a simple and compact mechanism for opening and closing a windshield, which includes a thrust element capable of deflection along a curvilinear path so that the device may be located in places otherwise not adapted for accommodating a windshield operating device.

Another object of the invention is to provide a windshield operating mechanism which may partly be disposed under the cowl and behind the instrument panel of the automobile.

Another object of the invention is to provide a windshield operating mechanism for a windshield hinged at its upper edge which is of such construction that an operating handle or the like may be mounted on the instrument panel where it will be conveniently accessible to those in the automobile.

Another object of the invention is to provide an improved closure operator wherein means is employed for moving the closure member which is of such character that the means may serve as a thrust element for pushing the closure or being sufficiently flexible that it may be moved in a curvilinear path.

Other objects of the invention will become apparent from the following description taken in conjunction with the accompanying drawings, and from the claims hereinafter set forth.

In the drawings,

Figure 1 is a fragmentary and cross-sectional view of an automobile body illustrating a windshield and mechanism for moving it to closed and open positions.

Fig. 2 is a cross-sectional view on a larger scale taken substantially along the line 2—2 of Fig. 1.

Fig. 3 is a cross-sectional view taken substantially along the line 3—3 of Fig. 2.

Fig. 4 is a cross-sectional view taken substantially along the line 4—4 of Fig. 2.

Fig. 5 is a cross-sectional view taken substantially along the line 5—5 of Fig. 3.

Fig. 6 is a cross-sectional view taken substantially along the line 6—6 of Fig. 4.

Fig. 7 is a cross-sectional view taken substantially along the line 7—7 of Fig. 3.

Referring to Fig. 1, the windshield is indicated at 10 and is hinged at its upper edge to the body of the vehicle so that it may be opened toward the front of the automobile as shown in broken lines. The cowl portion of the automobile is indicated at 11 and the instrument panel is indicated at 12, and in the particular construction illustrated, the panel 12 has an inner depending wall portion 13 upon which the windshield operating mechanism to be described may be mounted although it may be preferable in practice to provide the wall 13 as a separate member and secure it to the rear edge of the cowl.

As best shown in Figs. 2, 3, and 5, the device includes a housing 15 defined by a curved wall 16 and opposed end walls 17 and 18 terminating in laterally directed flanges 19 and 20 which are secured by bolts 21 to the wall portion 13 of the panel 12. The walls 17 and 18 are apertured as indicated at 23 and 24 and these apertures receive opposite ends of a pin or shaft 25 which is rigidly and non-rotatably held in place by providing a toothed head 26 on one end of the pin which when driven into the opening 24 positively locks the pin in position. A wheel 27 is rotatably mounted on the pin 25 and has a hub portion 28 that closely fits between the walls 17 and 18 so as to prevent endwise movement of the wheel while permitting its rotary movement on the pin. This hub terminates at one end in a worm wheel portion 30 by means of which the wheel may be driven.

For the purpose of reducing the cost of manufacture of the wheel 27 it is preferable to construct it of die cast metal but, since it is desired to have teeth on the wheel which are quite strong, a hard metal ring 31 forms a part of the wheel and this ring has teeth 32 at circumferentially spaced points which project outwardly beyond the periphery of the die cast portions. It will be understood that a wheel of this character is manufactured by die casting the softer metal around the hard metal ring 31. At one point the hub portion 28 has a radially projecting lug 33 which, as shown best by Fig. 5, is adapted to engage a struck-in lug 34 on the wall 18 so as to limit movement of the wheel 27 back and forth approximately through one revolution. For accommodating the teeth 31 on the wheel, the outer wall 16 of the housing has an outwardly pressed or grooved portion 36.

For opening and closing the windshield, a steel tape 40 is secured thereto at one end and the manner of securing the tape to the shield is best shown by Fig. 7 wherein a bracket 41 is fastened to the windshield frame and has a pin 42 journaled therein. This pin has a piece of sheet metal 43 looped about it and the projecting ends of the metal engage opposite sides of the tape 40 and are secured thereto by means of rivets 44. It is to be understood that the pin 42 may turn in the bracket 41 so that in opening the windshield relative and pivotal movement of the tape with respect to the shield may occur. In order to provide the necessary rigidity to the tape 40 to enable its use as a thrust member for pushing the windshield open, the tape is bowed transversely of its length and is built on a principle similar to that used in manufacturing steel ruling tapes of this type. The tape at spaced points has openings for receiving the teeth 32 on the wheel 27 and it follows that when the wheel is driven the tape will move therewith. During movement of the tape, however, it is necessary to positively guide it in a curvilinear path if it is to be moved in this manner and in accomplishing this result, the wall 16 of the housing is closely adjacent to the outer periphery of the wheel 27 and hence closely adjacent to that portion of the tape extending around the wheel. The provision of the groove portion 36 for accommodating the teeth enables locating the wall 16 in this manner without interfering with movement of the teeth. While it would be possible to allow the tape to run in a straight path and merely use the wheel to reciprocate it in such straight path, it would be impractical to use an arrangement of this character owing to the space which would be required for accommodating the tape. In the construction illustrated, however, if the tape is directed around the wheel in the manner shown, it will then be directed under the cowl 11 of the automobile and into a space which is not used and furthermore which is ordinarily invisible. For positively directing the opposite end of the tape as it leaves the wheel, the wall 16 has a straight portion 46 which projects beyond the edges of the walls 17 and 18 and which has turned over lips 47 and 48. The edges of the tape move under these lips and sufficient space is provided to accommodate the tape in this way.

It is to be emphasized that the tape is of such character that it will present sufficient rigidity to thrust open the windshield while still possessing enough flexibility that it may positively be moved in the curvilinear path surrounding the wheel periphery. It might be noted in this connection that when the windshield is closed, only a small linear portion of the tape extends between the shield and the wheel upon which the tape is wound and the wall portion 16 which is disposed around the outer side of the tape, and this short portion of the tape enables exercising a very great thrust force without danger of bending the tape and this is advantageous particularly in the event the windshield becomes stuck in its closed position. After the shield begins to open, little force is required to push it to its open position but it is to be understood that the tape possesses sufficient rigidity that it will not buckle even though the windshield is subjected to considerable air pressure.

Referring now to Fig. 4, the wheel is adapted to be driven by a shaft 50 having a worm 51 meshing with the worm wheel 30. This shaft at its inner end rests in a concave base portion of an inverted cup 52 that is slidably mounted in an upright cup 53 that projects through an opening in a downwardly offset portion 54 of the wall 16 at the side of the tape 46. The lower cup 53 is prevented from moving downwardly by means of a fold 55 formed in its side wall that engages the portion 54 around the opening. A spring 56 within the cups urges the cup 52 and the shaft upwardly and resiliently maintains the work in mesh with the worm wheel so as to take up for wear and maintain the close fitting mesh between the teeth at all times.

The shaft 50 projects through an opening 57 in the wall 16 and through a block 58 which, as best shown by Figs. 1 and 6, has a pin portion 59 that extends through a depending wall portion 60 on wall 17. The outer end of the pin portion 59 has a washer 61 on it and the end section of the pin is swaged over the washer so as to maintain the block fastened to the wall portion 60 although permitting its turning movement. The opening in block 58 through which the shaft 50 passes is open at one side to facilitate assembly and disassembly, and for maintaining the shaft in such opening a bracket element 62 is hooked over a shoulder portion of the block and is fastened thereto by a screw 63. On opposite sides of the block as shown by Fig. 4, collars 64 and 65 are provided which not only maintain the shaft axially in position but take any end thrust imparted thereto in operating the mechanism. The block being rotatable permits pivot movement of the shaft by the spring 56 as previously mentioned.

The shaft projects through an opening in the instrument panel 12 and has teeth 66 on its outer end which fit or mesh with corresponding teeth formed in an opening in a handle 67 and for maintaining the handle releasably on the shaft a pin may be disposed in an opening in the handle and passed through a groove 68. By removing the pin, the handle may be removed and turned to any desired position without turning the shaft so that the relative position of the handle with respect to the shaft may be varied whenever desired.

It is to be understood that the depending wall portion 13 of the instrument panel is provided with suitable openings for allowing the wheel 27 to project therethrough as well as the inner end of the shaft and the spring mounting therefor.

When the control mechanism is in place, the only visible part when the windshield is closed is the handle 67 and when the windshield is open the only visible part will be the tape connection between the windshield and the mechanism. In actual practice more than one of these devices may be used on the windshield as may be found most desirable. It will be readily appreciated that the mechanism provides a simple and compact arrangement for exerting thrust on the windshield elements and to hold it in open position and that the mechanism can efficiently be located under the cowl and behind the instrument panel.

Although only one form of the invention has been described and illustrated in detail, it will be apparent to those skilled in the art that various modifications may be made without departing from the scope of the appended claims.

I claim:

1. In combination, a vehicle body, a windshield or the like hinged to the body, and means for moving the windshield including a thin substantially ribbon-like metal strip bowed transversely of its length.

2. In combination, a vehicle body, a windshield or the like hinged to the body, and means for moving the windshield including an integral metal ribbon bowed transversely of its length and which is sufficiently resistant to bending that it will thrust the windshield open, while being sufficiently flexible that it may be moved in a curvilinear path.

3. In combination with a vehicle body member, a windshield member or the like hinged to the body member, a rotary sprocket wheel mounted on one member, an elongated element having sprocket openings and being trained around said wheel, and means connecting one end of said element to the other member, said element having sufficient rigidity that it may be employed to thrust the windshield open and having sufficient flexibility that it may train around the sprocket wheel.

4. In combination with a vehicle body member having a cowl, a windshield member or the like hinged at its upper edge to the body member and when closed being at the rear side of the cowl, a flexible steel member under the cowl and extending to a point rearwardly of the shield and then being deflected forwardly and being connected to the free edge of the shield, and means for reciprocating said flexible steel member, said steel member having sufficient rigidity to thrust the windshield open.

5. In combination with a vehicle body having a windshield hinged thereto, an instrument panel at the lower edge of the windshield, and a windshield opening and closing mechanism mounted forwardly of the panel and concealed thereby, said mechanism including a member connected to the windshield, and an element projecting rearwardly through the panel for enabling operation of the mechanism, said member comprising a flexible steel tape having sufficient rectilinear rigidity to thrust the windshield open and sufficient flexibility to permit the member to be moved in a curvilinear path.

6. In combination with a vehicle body member having a cowl and a windshield hinged to the body adjacent the cowl, an instrument panel at the lower edge of the windshield, and a windshield opening and closing mechanism mounted forwardly of the panel and adjacent the rear edge of the cowl, said mechanism including a steel tape connected to the windshield and having sufficient rectilinear rigidity to thrust the windshield open and sufficient flexibility to permit the tape to be deflected in a curvilinear path of movement so that it projects forwardly under the cowl, and an element projecting rearwardly through the panel for enabling operation of the mechanism.

7. An operating device for pivotal windshields or the like, comprising a housing, a wheel journalled in the housing and having circumferentially spaced teeth, a transversely bowed and normally straight steel tape having longitudinally spaced openings engaging the teeth on the wheel, means for connecting one end of the tape to the windshield, a curved wall on the housing extending partially around the wheel periphery for holding the normally concave side of the tape in engagement with the teeth and for causing the tape during its movement to bend out of its normally straight condition and around a portion of the wheel, and means for turning the wheel to impart linear thrusting and pulling movements to the tape.

8. An operating device for pivotal windshields or the like comprising a wheel having circumferentially spaced teeth, a transversely bowed and normally straight steel tape having longitudinally spaced openings for engaging the teeth on the wheel, means for connecting one end of the tape to the windshield, means for guiding and bending the tape circumferentially around a portion only of the wheel during linear movement of the tape and maintaining the teeth along said portion in engagement with openings in the tape, and means for turning the wheel.

9. An operating device for pivotal windshields or the like, comprising a wheel having circumferentially spaced teeth, a transversely bowed and normally straight tape having longitudinally spaced openings for engaging the teeth on the wheel, means for guiding and bending the tape circumferentially around a portion only of the wheel during linear movement of the tape and maintaining the teeth along said portion in engagement with openings in the tape while allowing the ends of the tape to move in substantially tangential paths relative to the wheel, and means for turning the wheel.

10. An operating device for windshields or the like comprising a wheel having circumferentially spaced teeth, a single and transversely bowed steel tape having longitudinally extending openings for engagement with the teeth, and having its concave side disposed next to the wheel periphery, means for guiding and bending the tape about a portion of the wheel periphery and maintaining the teeth along such portion in engagement with openings in the tape, and means for turning the wheel.

11. An operating device for windshields or the like, comprising a support, a wheel journaled on the support, a transversely bowed and normally straight tape adapted to be connected at one end to the windshield and to pass over the wheel, means on the wheel and tape for positively imparting linear movement to the tape when the wheel is turned, outer and stationary guide means adjacent the wheel periphery for bending a portion of the tape around and holding it under tension against the wheel periphery, while allowing the end portions of the tape to move in substantially tangential paths away from the wheel periphery, and means for turning the wheel.

12. An operating device for windshields or the like, comprising a transversely bowed and normally straight steel tape adapted to be connected at one end to the windshield, an arcuate guide wall along and disposed over one surface of the tape which arcuately deflects intermediate portions of the tape as it is linearly moved and which permits the end portions of the tape to leave the ends of the wall in substantially tangential and angularly related paths, means for holding the tape substantially against the wall as it moves over the latter, and means for imparting linear movement to the tape.

13. An operating device for windshields or the like comprising a transversely bowed and normally straight tape having longitudinally spaced openings, means connecting one end of the tape to the windshield, a support, a sprocket wheel mounted on the support and having teeth adapted to engage the openings in the tape, outer and curved guiding wall means extending partially around the wheel and adapted to cause the tape to bend around the wheel as it passes over the guide wall means and which permits the end portions of the tape to leave the wheel in substantially tangential and angularly related paths, means for maintaining the bending portion of the tape substantially against the guide wall means, and means for rotating the wheel.

14. An operating device for windshields or the like comprising a transversely bowed and normally straight tape having longitudinally spaced openings, means connecting one end of the tape to the windshield, a support, a sprocket wheel mounted on the support and having teeth adapted to engage the openings in the tape, outer and curved guiding wall means extending partially around the wheel and adapted to cause the tape to bend around the wheel as it passes over the guide wall means and which permits the end portions of the tape to leave the wheel in substantially tangential and angularly related paths, means for maintaining the bending portion of the tape substantially against the guide wall means, and means for rotating the wheel, said means for maintaining the tape against the guide wall comprising means on the wheel adjacent the teeth and engaging the inner surface of the bending portion of the tape.

15. An operating device for windshields or the like comprising a transversely bowed and normally straight tape having longitudinally spaced openings, means connecting one end of the tape to the windshield, a support, a sprocket wheel mounted on the support and having teeth adapted to engage the openings in the tape, outer and curved guiding wall means extending partially around the wheel and adapted to cause the tape to bend around the wheel as it passes over the guide wall means and which permits the end portions of the tape to leave the wheel in substantially tangential and angularly related paths, means for maintaining the bending portion of the tape substantially against the guide wall means, circumferentially extending recess means in the guide wall means for accommodating parts of the teeth projecting through the openings in the tape, and means for rotating the wheel.

16. An operating device for windshields or the like, comprising a support, a sprocket wheel journaled on the support, a transversely bowed and normally straight steel tape adapted to be connected at one end to the windshield and having spaced notches for engaging the teeth on the wheel, outer and stationary guide means adjacent the wheel periphery for bending a portion of the tape around and holding it under tension against the wheel periphery and the notches in engagement with one or more of the teeth while allowing the end portions of the tape to move in substantially tangential paths away from the wheel periphery, and means for rotating the wheel.

17. An operating device for windshields or the like, comprising a support, a sprocket wheel journaled on the support, a transversely bowed and normally straight steel tape adapted to be connected at one end to the windshield and having spaced notches for engaging the teeth on the wheel, outer and stationary guide means adjacent the wheel periphery for bending a portion of the tape around and holding it under tension against the wheel periphery and the notches in engagement with one or more of the teeth while allowing the end portions of the tape to move in substantially tangential paths away from the wheel periphery, and means for rotating the wheel, said guide means comprising a circumferentially extending wall having a circumferential recess for accommodating portions of the teeth projecting through said tape openings.

18. An operating device for windshields or the like comprising a normally straight and flexible metal tape, possessing sufficient linear rigidity to thrust and pull the windshield so as to move the same between open and closed positions, means for arcuately deflecting intermediate portions of the tape as it is moved in a linear direction the ends of the tape being free to move in angularly related paths substantially tangential to the deflecting portion, means for fastening the one end of the tape to the windshield, and means for imparting linear movement to the tape.

19. An operating device for closures, comprising a normally straight, transversely bowed tape, means for fastening one end of the tape to the closure, and means for imparting linear movement to the tape.

20. In combination with a vehicle body member having a cowl portion, a windshield or the like hinged to the body, a flexible steel member connected to the rear side of the windshield and having sufficient linear rigidity to thrust the windshield open, means for arcuately deflecting the member intermediate its ends as it moves so that the opposite ends project forwardly in directions substantially tangential to the arcuate portion and over and above the cowl portion respectively, means for connecting one end of the member to the windshield, and means for imparting linear movement to the member.

21. In combination, a movable closure, a transversely bent, thin substantially ribbon-like steel tape connected at one end to the closure and having sufficient linear rigidity to move the closure when the tape is moved linearly, and means for linearly moving the tape to effect movement of the closure.

22. In combination, a movable closure, a transversely bowed substantially ribbon-like steel tape connected at one end to the closure and having its other end free, and possessing sufficient linear rigidity to move the closure when the tape is moved linearly, and means for moving the tape linearly to effect movement of the closure.

23. In combination, a movable closure, a transversely bowed steel tape connected at one end to the closure and having its other end free, and possessing sufficient linear rigidity to move the closure when the tape is moved linearly, and means for moving the tape linearly to effect movement of the closure, said means including a curved guiding member for causing the tape intermediate its ends to move in a curved path while allowing other portions to move in paths substantially tangential to the curved path.

24. A vehicle body having, in combination, a windshield hingedly connected at one edge to the body for outward swinging movement, means for holding the windshield in an open position including a substantially ribbon-like steel strip having its forward end operatively connected to the swinging edge of the windshield for movement with the latter, means carried by a part of the body fixed relative to the windshield and having an arcuate portion slidably engaging said strip, said strip possessing the flexibility required to permit the same to travel along the path defined by the arcuate portion and also having sufficient column stiffness to effectively support the windshield in an open position.

25. In combination, a movable closure, a normally straight, substantially ribbon-like strip having one end connected to the closure and having its other end free, an arcuate surface fixed with respect to the closure engaging and deflecting the strip intermediate its ends so that its end portions move at angles to each other, and means for holding the deflecting portion of the strip substantially against the arcuate surface, said strip having sufficient flexibility to permit it to follow the arcuate surface and having sufficient linear rigidity to support the closure.

26. In combination, a movable closure, a normally straight, substantially ribbon-like strip having one end connected to the closure and having its other end free, an arcuate surface fixed with respect to the closure engaging and deflecting the strip intermediate its ends so that its end portions move at angles to each other, means for holding the deflecting portion of the strip substantially against the arcuate surface but permitting its movement along said surface, and means cooperating with the strip for holding the closure in adjustable positions, said strip having sufficient flexibility to permit it to move along and follow the arcuate surface and sufficient linear rigidity to support the closure.

27. In combination, a movable closure, a normally straight, substantially ribbon-like strip having one end connected to the closure and having its other end free, an arcuate surface fixed with respect to the closure engaging and deflecting the strip intermediate its ends so that its end portions move at angles to each other, and rotary means for holding the deflecting portion of the strip substantially against the arcuate surface, said strip having sufficient flexibility to permit it to follow the arcuate surface and having sufficient linear rigidity to support the closure.

28. In combination, a movable closure, a normally straight, transversely bowed, and substantially ribbon-like strip, having one end connected to the closure and having its other end free, an arcuate surface fixed with respect to the closure engaging and deflecting the strip intermediate its ends so that its end portions move at angles to each other, and means for holding the deflecting portion of the strip substantially against the arcuate surface but permitting its movement along said surface, said strip having sufficient flexibility to permit it to move along and follow the arcuate surface and sufficient linear rigidity to support the closure.

29. A vehicle body having, in combination, a windshield hingedly connected at one edge to the body for outwardly swinging movement, means for holding the windshield in an open position including a normally straight, substantially ribbon-like, transversely bowed steel tape having one end connected to the swinging edge of the windshield, means carried by a part of the body fixed relative to the windshield and having an arcuate portion operatively engaging the tape for the purpose of guiding it during its linear movement, and rotary means mounted on the body for holding that side of the tape opposite the side operatively engaging the arcuate portion so as to hold the tape operatively against the latter, said tape possessing the flexibility required to permit the same to travel along the path defined by the arcuate portion and also having column stiffness to effectively support the windshield, the end portions of the tape being movable to and from the arcuate portion in substantially straight condition and at angles to each other.

30. A vehicle body having, in combination, a windshield hingedly connected at one edge to the body for outwardly swinging movement, means for holding the windshield in an open position including a normally straight substantially ribbon-like, transversely bowed steel tape having one end connected to the swinging edge of the windshield, means carried by a part of the body fixed relative to the windshield and having an arcuate portion operatively engaging the tape for the purpose of guiding it during its linear movement, rotary means mounted on the body for holding that side of the tape opposite the side operatively engaging the arcuate portion so as to hold the tape operatively against the latter, said tape possessing the flexibility required to permit the same to travel along the path defined by the arcuate portion and also having column stiffness to effectively support the windshield, the end portions of the tape being movable to and from the arcuate portion in substantially straight condition and at angles to each other, and means including recesses in the tape for holding the tape and windshield in adjustable positions.

31. A vehicle body having, an instrument panel, a windshield hingedly connected at one edge to the body for outwardly swinging movement, means for holding the windshield in an open position including a substantially ribbon-like, transversely bowed steel tape having one end connected to the swinging edge of the windshield, means carried by a part of the body fixed relative to the windshield and having an arcuate portion at the front of the panel, the tape extending rearwardly and operatively engaging the arcuate portion so as to be deflected and guided intermediate its ends during linear movement of the tape, the tape extending in a substantially straight condition rearwardly from the windshield to one end of the arcuate portion, then being deflected by the arcuate portion and then having its opposite end portion extending forwardly in a substantially straight condition from the other end of the arcuate portion, rotary means mounted on the body for holding that side of the tape opposite the side operatively engaging the arcuate portion so as to hold the tape operatively against the latter, said tape possessing the flexibility required to permit the same to travel along the path defined by the arcuate portion and also having column stiffness to effectively support the windshield, and means including recesses in the tape for holding the latter and windshield in adjustable positions.

32. In combination, a support, a movable closure or the like, and means movably mounted on the support for holding the closure in different positions of adjustment, said means including a transversely bowed ribbon-like steel tape having one end connected to the closure, and means on the support engageable with the tape for holding the latter in different positions of adjustment, said tape possessing sufficient column stiffness to support the closure.

33. In combination, a support, a movable closure or the like, and means movably mounted on the support for holding the closure in different positions of adjustment, said means including a transversely bowed ribbon-like steel tape, having one end connected to the closure, a curved wall over which the tape is movable, and rotary means for holding the tape in curved condition against such wall, said tape possessing sufficient column stiffness to support the closure.

34. In combination, a movable closure, a normally straight transversely bowed, and substantially ribbon-like strip, having one end connected to the closure and having its other end free, an arcuate surface fixed with respect to the closure engaging and deflecting the strip intermediate its ends so that its end portions move at angles to each other, means for holding the deflecting portion of the strip substantially against the arcuate surface but permitting its movement along said surface, and means for locking the tape in different positions of linear adjustment, said tape possessing sufficient column stiffness to support the closure and sufficient flexibility to move along and follow the arcuate surface.

ALBERT T. POTTER.